UNITED STATES PATENT OFFICE.

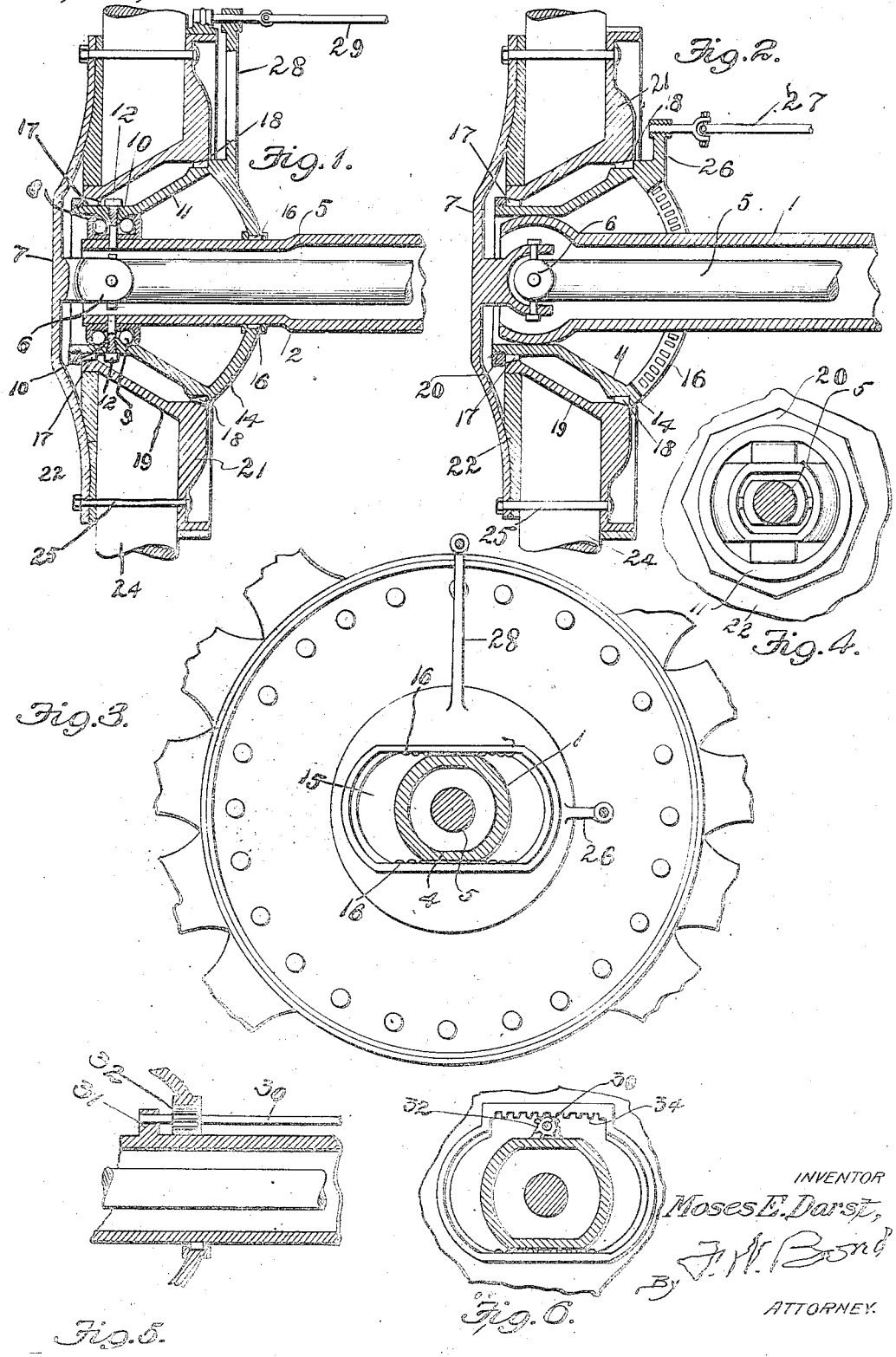

MOSES E. DARST, OF CANTON, OHIO.

VEHICLE-WHEEL.

1,320,605.      Specification of Letters Patent.      Patented Nov. 4, 1919.

Application filed April 13, 1918. Serial No. 228,446.

*To all whom it may concern:*

Be it known that I, MOSES E. DARST, a citizen of the United States, residing at Canton, in the county of Stark and State of Ohio, have invented new and useful Vehicle-Wheels, of which the following is a specification.

This invention relates to vehicle wheels and more especially to wheels designed to be used on motor vehicles employing the four wheel drive construction, the object being to provide a wheel that may be driven through a hollow spindle.

Another object is to connect the driving axle to the wheel by means of a universal joint so that the wheel can be turned for steering.

Another object is to construct a wheel for the four wheeled drive and four wheeled steering principle in which the well known full floating axle is employed.

Another object is to greatly simplify the construction and assemblage of this class of wheels, my wheel having but three operations for the complete assembling or disassembling.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

In the drawings:

Figure 1 is a vertical sectional view taken through the center of my wheel.

Fig. 2 is a horizontal section taken at right angles to the section shown in Fig. 1.

Fig. 3 is a fragmentary side elevation of one of my wheels looking from the side next to the vehicle with the live axle and axle housing shown in section.

Fig. 4 is a transverse sectional view.

Fig. 5 is a fragmentary detail showing a modified form of steering rod connection.

Fig. 6 is a section taken on the line 6—6, of Fig. 5.

Similar numerals of reference indicate corresponding parts throughout the several figures of the drawings.

The construction which I have disclosed in my drawings is designed primarily to give a simple accessible construction to a wheel of this type and at the same time provide a wheel of rugged construction adapted for use upon heavy duty trucks, etc. In automobile construction the type of rear axle known as the "full floating," viz., the type in which the full weight of the vehicle is carried on the axle housing or dead axle, the live or rotating axle serving merely to drive the wheel and being assembled in such a manner that the removal of the exterior hub plates of the wheels permits the live axle to be withdrawn through the wheel without disassembling the differential. In what is known as the four wheel drive motor vehicle, the same type of axle can be employed for each of the four wheels and since the front wheels of the vehicle must be mounted to pivot so that the car can be steered, the rear wheels being mounted in the same fashion adds the advantage in steering, of swinging all four wheels thus enabling the car to turn on a much shorter radius.

The dead axle or axle housing shown at 1 in the drawings is tubular in cross section from the differential outwardly to the point 2, just inside the hub of the road wheels. From the point 2 outwardly the axle housing is flattened on the top and bottom, as shown at 4. The live or rotating axle 5 is connected by a universal joint 6 to the hub plate 7 of the wheel and in vertical alinement with the center of the said universal joint, are ball bearings 8 and 9 secured to the flattened upper and lower faces of the axle housing and coöperating with cone portions 10 formed upon the inner face of a hollow spindle 11. Bolts 12 threaded into the hollow spindle extend inwardly through the center of the ball bearings, as shown in Fig. 1, and fit within apertures in the axle housing. The spindle 11 is frusto-conical as shown in Figs. 1 and 2, the larger or inner end of the said spindle having formed integral therewith a spherical cover plate 14, the arc of the sphere being centered at the exact center of the universal joint 6. A slot 15 is formed in this cover plate 14 and fixed upon the upper and lower inner faces of the said slot are roller bearings shown at 16, which bearings contact with the flattened faces of the axle housing, as shown in Fig. 3. Roller bearings 17 mounted upon the exterior face of the spindle 11 at a point adjacent its outer end, together with a roller bearing 18 mounted upon the spindle at its inner or larger end, are designed to carry the wheel hub 19. A jam nut 20 secures the wheel in position upon the spindle. An annular outstanding flange 21 is formed integral with the hub 19; this and an annular ring 22 fitting about the spindle form retaining plates for the spokes 24 and are held in place by bolts 25 which also secure the hub plate 7 to the wheel.

Extending rearwardly from the spherical portion 14 of the spindle is a lug 26 to which is secured the steering arm 27 attached by suitable means to the steering control upon the vehicle. Operation of the steering wheel of the vehicle will move the rod 27 inwardly or outwardly thus swinging the spindle and wheel carried thereon, the said spindle pivoting on the bolts 12, the ball bearings 8 and 9 permitting the free movement of the said spindle upon the housing 1, and since the pivotal point of the wheel is the bolts 12, which bolts are located in vertical alinement with the center of the universal joint 6, the live axle 5 is permitted to drive the wheel while the same is moved out of right angle position with regard to the said axle. The roller bearings 16 previously referred to permit the spindle to move smoothly over the flattened upper and lower faces of the axle housing, the slot 15 being of sufficient length to allow the maximum movement necessary without permitting the spindle to contact with the said axle housing.

Extending upwardly from the portion 14 of the spindle is an integral arm 28 which extends beyond the periphery of the inner hub plate 21 and has mounted therethrough the brake operating rod 29. Universal joints are provided in both the rod 27 of the steering mechanism and the brake operating rod 29 so that the said rods do not move out of alinement as the wheel is turned to steer the machine.

In Figs. 5 and 6 I have shown another form of steering mechanism which may be employed, in this instance a rigid arm, shown at 30, being journaled in a bearing 31 upon the axle housing and having keyed thereto a pinion 32 which meshes with rack teeth 34 formed upon the inner upper face of the slot 15. With this construction it will be seen that the universal joint in the steering rod can be done away with, the rotation of the rod 30 causing the spindle to move backward and forward upon its pivot.

In assembling my wheel the spindle is placed over the axle housing and secured by inserting the bolts 12; the wheel is then placed upon the spindle and secured by means of the nut 20, after which the live axle 5 is inserted through the open end of the axle housing and the hub plate 7 attached to the said live axle, brought into position and secured by the bolts 25. It is thus seen that only three operations are necessary to assemble or knock-down my wheel. A portion of the lubrication placed within the differential housing will work outwardly through the axle housing in the usual manner in "full floating" axle construction, lubricating the universal joint, and passing the outer extremity of the axle housing will be thrown outwardly by centrifugal force when the wheel is rotated, in the nature of a splash lubrication system, a sufficient amount of the lubricant thus thrown outwardly finding its way in to the ball bearings 8 and 9. In assembling the wheel the space between the conical portion of the spindle 11 and the hub 19 will be filled with ordinary cup grease which will lubricate the roller bearings 17 and 18.

Especial attention is called to the fact that the hollow spindle serves both as a spindle and as a wheel cone, the bearings 17 and 18 running upon the said cone spindle being the regular wheel bearings used in motor vehicle wheels.

Having fully described my invention what I claim as new and desire to secure by Letters Patent, is—

In a wheel of the character described, an axle housing, a hollow conical spindle pivoted upon said housing, anti-friction bearings coöperating between said hollow conical spindle and said housing at the said pivotal point, a wheel rotatably carried upon said hollow conical spindle, a rotatable live axle within said axle housing, the spindle being provided with an elongated slot through which the axle housing extends, a shaft journaled upon the axle housing, a pinion carried by said shaft and rack teeth within the slot in the spindle, meshing with said pinion.

In testimony that I claim the above, I have hereunto subscribed my name.

MOSES E. DARST.